(12) United States Patent
Yiu

(10) Patent No.: US 9,973,915 B2
(45) Date of Patent: May 15, 2018

(54) HANDOVER WITH PING PONG AVOIDANCE IN A WIRELESS NETWORK

(71) Applicant: Candy Yiu, Portland, OR (US)

(72) Inventor: Candy Yiu, Portland, OR (US)

(73) Assignee: INTEL IP CORPORATION, Santa Clara, CA (US)

(*) Notice: Subject to any disclaimer, the term of this patent is extended or adjusted under 35 U.S.C. 154(b) by 111 days.

(21) Appl. No.: 14/763,204

(22) PCT Filed: Dec. 26, 2013

(86) PCT No.: PCT/US2013/077754
§ 371 (c)(1),
(2) Date: Jul. 24, 2015

(87) PCT Pub. No.: WO2014/130157
PCT Pub. Date: Aug. 28, 2014

(65) Prior Publication Data
US 2015/0373596 A1    Dec. 24, 2015

Related U.S. Application Data

(60) Provisional application No. 61/768,330, filed on Feb. 22, 2013.

(51) Int. Cl.
*H04W 36/30* (2009.01)
*H04W 8/00* (2009.01)
(Continued)

(52) U.S. Cl.
CPC ......... *H04W 8/005* (2013.01); *H04L 12/4633* (2013.01); *H04L 27/2614* (2013.01);
(Continued)

(58) Field of Classification Search
CPC ..... H04W 8/005; H04W 48/16; H04W 48/08; H04W 28/12; H04W 28/0289;
(Continued)

(56) References Cited

U.S. PATENT DOCUMENTS 5,457,810 A    10/1995  Ivanov et al.
9,357,464 B2 *  5/2016  Olofsson ........... H04W 36/0083
(Continued)

FOREIGN PATENT DOCUMENTS

JP    WO 2012/090357    *  7/2012    ............ H04W 36/38

OTHER PUBLICATIONS

Extended European Search Report issued in European Application No. EP13875403.1, dated Oct. 31, 2016.
(Continued)

*Primary Examiner* — Edan Orgad
*Assistant Examiner* — Ivan O Latorre
(74) *Attorney, Agent, or Firm* — Grossman Tucker Perreault & Pfleger, PLLC

(57) ABSTRACT

Generally, this disclosure provides apparatus and methods for improved handover with ping pong avoidance in wireless heterogeneous networks. The UE device may include a handover (HO) module configured to determine a reference signal received power (RSRP) difference between a serving cell and a neighbor cell and to select a TimeToTrigger (TTT) related to an HO measurement report based, at least in part, on the RSRP difference.

9 Claims, 8 Drawing Sheets

(51) Int. Cl.

| | | |
|---|---|---|
| H04W 72/04 | (2009.01) | |
| H04W 74/02 | (2009.01) | |
| H04W 76/02 | (2009.01) | |
| H04W 72/00 | (2009.01) | |
| H04W 76/04 | (2009.01) | |
| H04L 12/46 | (2006.01) | |
| H04W 4/00 | (2018.01) | |
| H04L 29/12 | (2006.01) | |
| H04W 28/02 | (2009.01) | |
| H04W 40/02 | (2009.01) | |
| H04W 48/18 | (2009.01) | |
| H04W 24/06 | (2009.01) | |
| H04W 74/00 | (2009.01) | |
| H04W 74/04 | (2009.01) | |
| H04W 74/08 | (2009.01) | |
| H04W 36/00 | (2009.01) | |
| H04L 27/26 | (2006.01) | |
| H04W 40/24 | (2009.01) | |
| H04W 24/02 | (2009.01) | |
| H04W 48/14 | (2009.01) | |
| H04W 52/02 | (2009.01) | |
| H04W 28/12 | (2009.01) | |
| H04L 12/801 | (2013.01) | |
| H04W 48/08 | (2009.01) | |
| H04W 48/16 | (2009.01) | |
| H04W 72/02 | (2009.01) | |
| H04W 88/06 | (2009.01) | |
| H04L 12/725 | (2013.01) | |
| H04W 28/08 | (2009.01) | |
| H04W 84/12 | (2009.01) | |

(52) U.S. Cl.
CPC ............ *H04L 47/11* (2013.01); *H04L 47/12* (2013.01); *H04L 61/2514* (2013.01); *H04L 61/2525* (2013.01); *H04L 61/2539* (2013.01); *H04L 61/2564* (2013.01); *H04L 61/2575* (2013.01); *H04L 61/2592* (2013.01); *H04L 61/6077* (2013.01); *H04W 4/005* (2013.01); *H04W 4/008* (2013.01); *H04W 24/02* (2013.01); *H04W 24/06* (2013.01); *H04W 28/02* (2013.01); *H04W 28/0289* (2013.01); *H04W 28/12* (2013.01); *H04W 36/0088* (2013.01); *H04W 36/30* (2013.01); *H04W 40/02* (2013.01); *H04W 40/244* (2013.01); *H04W 48/08* (2013.01); *H04W 48/14* (2013.01); *H04W 48/16* (2013.01); *H04W 48/18* (2013.01); *H04W 52/028* (2013.01); *H04W 52/0216* (2013.01); *H04W 72/005* (2013.01); *H04W 72/02* (2013.01); *H04W 72/042* (2013.01); *H04W 72/0413* (2013.01); *H04W 72/0446* (2013.01); *H04W 74/002* (2013.01); *H04W 74/02* (2013.01); *H04W 74/04* (2013.01); *H04W 74/08* (2013.01); *H04W 76/023* (2013.01); *H04W 76/043* (2013.01); *H04L 45/30* (2013.01); *H04W 28/08* (2013.01); *H04W 84/12* (2013.01); *H04W 88/06* (2013.01); *Y02D 70/00* (2018.01); *Y02D 70/1222* (2018.01); *Y02D 70/1224* (2018.01); *Y02D 70/1226* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/21* (2018.01); *Y02D 70/22* (2018.01); *Y02D 70/23* (2018.01)

(58) Field of Classification Search
CPC .......... H04W 52/028; H04W 52/0216; H04W 48/14; H04W 4/005; H04W 24/02; H04W 40/244; H04W 36/0088; H04W 36/30; H04W 74/002; H04W 72/0446; H04W 74/04; H04W 74/08; H04W 4/008; H04W 76/043; H04W 72/005; H04W 76/023; H04W 24/06; H04W 28/02; H04W 40/02; H04W 48/18; H04W 74/02; H04W 72/0413; H04W 84/12; H04W 28/08; H04W 88/06; H04L 61/2514; H04L 61/2564; H04L 61/2525; H04L 61/6077; H04L 61/2592; H04L 61/2575; H04L 47/12; H04L 47/11; H04L 27/2614; H04L 12/4633; H04L 61/2539; H04L 45/30; Y02B 60/50

See application file for complete search history.

(56) References Cited

U.S. PATENT DOCUMENTS

| | | | |
|---|---|---|---|
| 9,655,014 B2* | 5/2017 | Wegmann | H04W 36/0083 |
| 2008/0220784 A1 | 9/2008 | Somasundaram et al. | |
| 2009/0143093 A1* | 6/2009 | Somasundaram | H04W 36/32 455/525 |
| 2009/0323638 A1 | 12/2009 | Catovic et al. | |
| 2010/0173626 A1* | 7/2010 | Catovic | H04W 76/027 455/423 |
| 2010/0272050 A1* | 10/2010 | Lim | H04W 8/22 370/329 |
| 2010/0330992 A1 | 12/2010 | Bhattacharjee et al. | |
| 2011/0026492 A1* | 2/2011 | Frenger | H04W 36/38 370/331 |
| 2011/0059741 A1 | 3/2011 | Klein | |
| 2011/0081903 A1 | 4/2011 | Cai et al. | |
| 2011/0188472 A1 | 8/2011 | Jeon et al. | |
| 2012/0238272 A1* | 9/2012 | Hwang | H04W 36/245 455/436 |
| 2013/0040692 A1* | 2/2013 | Chen | H04W 36/04 455/525 |
| 2013/0045749 A1* | 2/2013 | Sridhar | H04W 36/0083 455/443 |
| 2013/0244664 A1* | 9/2013 | Song | H04W 36/0083 455/437 |
| 2013/0273919 A1* | 10/2013 | Sashihara | H04W 36/0083 455/436 |
| 2014/0066074 A1* | 3/2014 | Folke | H04W 36/08 455/437 |
| 2014/0099941 A1* | 4/2014 | Ji | H04W 16/14 455/423 |
| 2014/0213255 A1* | 7/2014 | Muller | H04W 36/30 455/436 |
| 2014/0213259 A1* | 7/2014 | Teyeb | H04W 48/16 455/436 |
| 2014/0349656 A1* | 11/2014 | Sfar | H04W 36/36 455/437 |
| 2014/0378142 A1* | 12/2014 | Xuan | H04W 36/0088 455/437 |
| 2015/0126196 A1* | 5/2015 | Lu | H04W 76/048 455/437 |
| 2015/0312815 A1* | 10/2015 | Wanstedt | H04W 36/0077 455/436 |

OTHER PUBLICATIONS

International Search Report and Written Opinion received for PCT Application No. PCT/US2013/077754, dated Apr. 24, 2014, 11 pages.
3GPP TS 36.212, V10.1.0 (Mar. 2011), 3rd Generation Partnership Project; Technical Specification Group Radio Access Network; Evolved Universal Terrestrial Radio Access (E-UTRA); Multiplexing and channel coding (Release 10), 2011, 76 pages.

(56) References Cited

OTHER PUBLICATIONS

3GPP TS 36.211, V10.1.0 (Mar. 2011), 3rd Generation Partnership Project; Technical Specification Group Radio Access Network; Evolved Universal Terrestrial Radio Access (E-UTRA); Physical Channels and Modulation (Release 10), 2011, 103 pages.
3GPP TS 36.331, V10.1.0 (Mar. 2011), 3rd Generation Partnership Project; Technical Specification Group Radio Access Network; Evolved Universal Terrestrial Radio Access (E-UTRA); Radio Resource Control (RRC); Protocol specification (Release 10), 2011, 290 pages.
3GPP TS 36.304, V9.2.0 (Mar. 2010), 3rd Generation Partnership Project; Technical Specification Group Radio Access Network; Evolved Universal Terrestrial Radio Access (E-UTRA); User Equipment (UE) procedures in idle mode (Release 9), 2010, 32 pages.
3GPP TS 23.221, V8.8.0 (Mar. 2011), 3rd Generation Partnership Project; Technical Specification Group Services and System Aspects; Architectural requirements (Release 8), 2011, 47 pages.
3GPP TS 24.301, Version 10.3.0, Release 10, Universal Mobile Telecommunications System (UMTS); LTE; Non-Access-Stratum (NAS) protocol for Evolved Packet System (EPS); Stage 3, 2011, 308 pages.
3GPP TS 36.413, Version 10.5.0, Release 10, LTE; Evolved Universal Terrestrial Radio Access Network (E-UTRAN); S1 Application Protocol (S1AP), 2012, 262 pages.
3GPP TS 33.401, Version 10.3.0, Release 10, Digital cellular telecommunications system (Phase 2+); Universal Mobile Telecommunications System (UMTS); LTE; 3GPP System Architecture Evolution (SAE); Security architecture, 2012, 118 pages.
Partial Supplementary European Search Report received for European Patent Application No. 13875403.1, dated Jul. 255, 2016, 10 pages.
3GPP TS 36331; "3rd Generation Partnership Project; Technical Specification Group Radio Access Network; Evolved Universal Terrestrial Radio Access (E-UTRA); Radio Resource Control (RRC); Protocol specification"; V. 10.8.0, Release 10, Dec. 2012, 305 pages.
3GPP TSG RAN WG2 Meeting #77 bis; Intel Corporation; "Mobility performance enhancements using RSRP"; Agenda Item: 7.10.4; R2-121744; Jeju, Korea; Mar. 26-30, 2012; 4 pages.
3GPP TSG RAN WG2 Meeting #83; Intel Corporation; Fast Handover for using RSRP/RSRQ with SToS/Ping-pong Avoidance; Agenda item: 7.1.1; R2-132809; Barcelona, Spain, Aug. 19-23, 2013, 6 pages.
3GPP TSG RAN WG2 Meeting #83bis; Intel Corporation; "Stage 3 signaling for fast handover using RSRP/RSRQ with SToS/Ping-pong avoidance"; Agenda item 7.1.1.2; R2-133504; Ljubljana, Slovenia; Oct. 7-11, 2013, 6 pages.
European Office Action issued in European Application No. EP13875403.1, dated Oct. 9, 2017, 6 pages.

* cited by examiner

HANDOVER WITH PING PONG AVOIDANCE IN A WIRELESS NETWORK

CROSS-REFERENCE TO RELATED APPLICATIONS

The present patent application is related to and claims priority to U.S. Provisional Patent Application Ser. No. 61/768,330, filed Feb. 22, 2013, the teachings of which are incorporated herein by reference in their entirety.

FIELD

The present disclosure relates to wireless networks, and more particularly, to apparatus and methods for improved handover with ping pong avoidance in wireless networks.

BACKGROUND

Wireless networks, for example Long Term Evolution (LTE) and LTE-Advanced (LTE-A) networks, may include heterogeneous networks that include "macro cells," providing higher power/wider area coverage, and "small cells," providing lower power/reduced area coverage. Small cells may include "femto cells," suitable for home or office coverage and "pico cells," for larger indoor environments such as shopping centers. A base station, for example an evolved Node B (eNB) transceiver, may be associated with each cell to provide network access to wireless mobile devices, for example User Equipment (UE), passing through that cell coverage area. Small cells may be located within a macro cell coverage area. These small cells may be provided to offer additional capacity (e.g., to handle more UEs) or they may be provided to offer additional coverage (e.g., to fill in coverage holes or gaps in the macro cell coverage area).

As the UE travels in the cell coverage areas, cell handovers may be required. Successful handover relies on the UE receiving the handover command from the current (serving) cell. Generally, to facilitate successful handover, the handover should be initiated and the handover command transmitted relatively quickly. However, handover that occurs too quickly may result in ping pong. Ping pong occurs when a UE enters, e.g., cell B from cell A, handover occurs from cell A to cell B, the UE remains in cell B a relatively short period of time, e.g., less than one second.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides devices, systems and methods for improved User Equipment (UE) handover (HO) with ping pong avoidance in a wireless heterogeneous network (HetNet), for example an LTE or LTE-A network that includes macro cells and small cells. A network manager may be configured to generate, determine and/or select one or more HO parameters and to provide at least some of the HO parameters to a UE via, e.g., an evolved Node B (eNB). The HO parameters may include one or more reference signal received power (RSRP) difference thresholds and a minimum TimeToTrigger (TTT). TTT is related to a handover measurement report, as described herein. For example, a first RSRP difference threshold may correspond to an RSRP difference that correlates to likely handover failure (HOF). In another example, a second RSRP threshold may correspond to an RSRP difference related to the minimum TTT. The HO parameters may further include one or more TTT, ToS pair(s) configured to relate TTT to ToS (Time of Stay) to reduce a likelihood of the UE ping-ponging, and may include a short ToS value. For example, the ToS may be measured from a most recent successful handover of the UE.

A UE that has satisfied an Event A3 (neighbor becomes offset better than Pcell) entry condition may be configured to select a TTT related to a handover (HO) measurement report based, at least in part, on a RSRP difference. The RSRP difference is a difference between an RSRP received from a neighbor cell (i.e., target cell) and an RSRP received from a serving cell. The UE may be configured to determine the RSRP difference prior to and/or after the Event A3 entry condition has been satisfied. TimeToTrigger (TTT) corresponds to a time interval between satisfying the Event A3 entry condition and the HO measurement report being triggered in the UE. In other words, the HO measurement report is triggered in the UE at the expiry of the TTT interval. In some embodiments, the UE may be further configured to select the TTT based, at least in part, on a Time of Stay (ToS) in the serving cell.

Thus, handover from the serving cell to the neighbor cell may occur relatively more reliably based, at least in part, on a determined RSRP difference between the neighbor cell and the serving cell.

Figure 1:
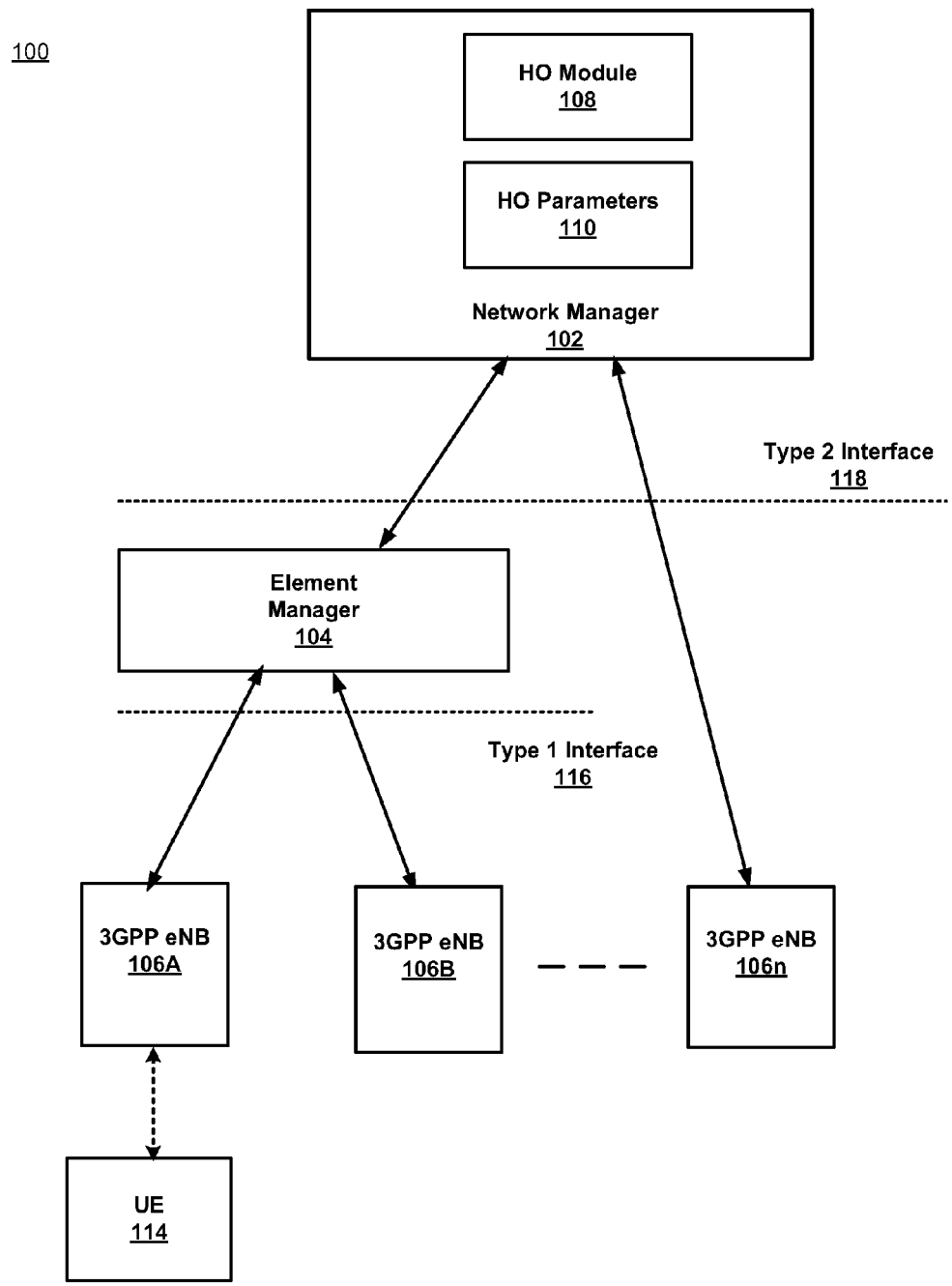
FIG. 1 illustrates an example wireless network system according to various embodiments of the present disclosure.

FIG. 1 illustrates an example wireless network system diagram 100 according to various embodiments of the present disclosure. The system 100 generally includes a plurality of hardware devices, hardware platforms and associated signaling, functionality, and definition which may generally comply with, or otherwise be compatible with, the Third Generation Partnership Project (3GPP) Long Term Evolution (LTE) and/or LTE-Advanced (LTE-A) based wireless network standard, including current, previous and future versions of that standard. These may include, for example, 3GPP TS 36.212: "Evolved Universal Terrestrial Radio Access (E-UTRA); Multiplexing and channel coding", 3GPP TS 36.211: "Evolved Universal Terrestrial Radio Access (E-UTRA); Physical channels and modulation", 3GPP TS 36.331: "Evolved Universal Terrestrial Radio Access (E-UTRA); Radio Resource Control; Protocol specification", 3GPP TS 36.304: "Evolved Universal Terrestrial Radio Access (E-UTRA); User Equipment (UE) procedures in idle mode", 3GPP TS 23.221, 3GPP TS 24.301, 3GPP TS 36.413, 3GPP TS 33.401, etc. Reference to hardware platforms and/or software modules (e.g., UE, eNodeB, eNB, etc.) and associated signaling and functionality, as used herein, may be generally defined by the aforementioned 3GPP standards, and/or derivatives thereof.

The wireless network 100 includes a network manager (NM) 102, at least one element manager (EM) 104, and a plurality of eNodeBs (eNBs) 106A, 106B, . . . , 106(n). In this example, eNB 106A and 106B are configured to communicate with the NM 102 via the EM 104, and eNB 106n is configured to communicate with the NM 102, in which case, in some embodiments, eNB 106n may include an EM to facilitate such communication. Each eNB 106A, 106B, . . . , 106n is generally configured to provide cell coverage areas (not shown in this Figure). In some embodiments, one or more eNBs may be operable to cover a single cell area, while in other embodiments, at least one eNB may be operable to cover multiple cells or sectors, while in other embodiments, at least one cell may be partitioned so that multiple eNBs cover that cell. While this is a simplified example, for illustration purposes, it will be appreciated that in practice any configuration of eNBs, UEs and WLAN APs of various types may be deployed and may provide coverage extending to any number or areas, regions or sectors. User equipment (UE, not shown) may typically be configured to transmit voice and data traffic to and from the eNB 106. NM 102 may be configured to communicate with the eNBs in the network 100, to facilitate HO operation, as will be described in greater detail below.

The NM 102 typically includes computer systems and/or software applications configured to provide and facilitate network support functions to network operators or providers. These support functions may include configuration, performance monitoring and fault detection, and coordinating various operations of the EM 104 and/or eNBs 106A, 106B, . . . , 106n. The EM 104 may be configured to provide both element and domain management function for a sub-network, and to provide a set of end-user functions for management of a set of related types of network elements, for example, the eNBs 106A, 106B, . . . , 106n. The NM 102, the EM 104, and eNB 106n may include interface circuitry to enable communication. In one example, the interface may include a type 2 interface 118. The type 2 interface 118 may be defined by the aforementioned 3GPP standard and/or a user defined (e.g., proprietary) interface protocol. The EM 104 and the eNBs 106A and 106B may also include interface circuitry to enable communication there between. In one example, the interface may include a type 1 interface 116. The type 1 interface 116 may be defined by the aforementioned 3GPP standard and/or a user defined (e.g., proprietary) interface protocol. The EM 104 may also be configured to provide message translation between the type 1 interface 116 and the type 2 interface 118.

Figure 2:
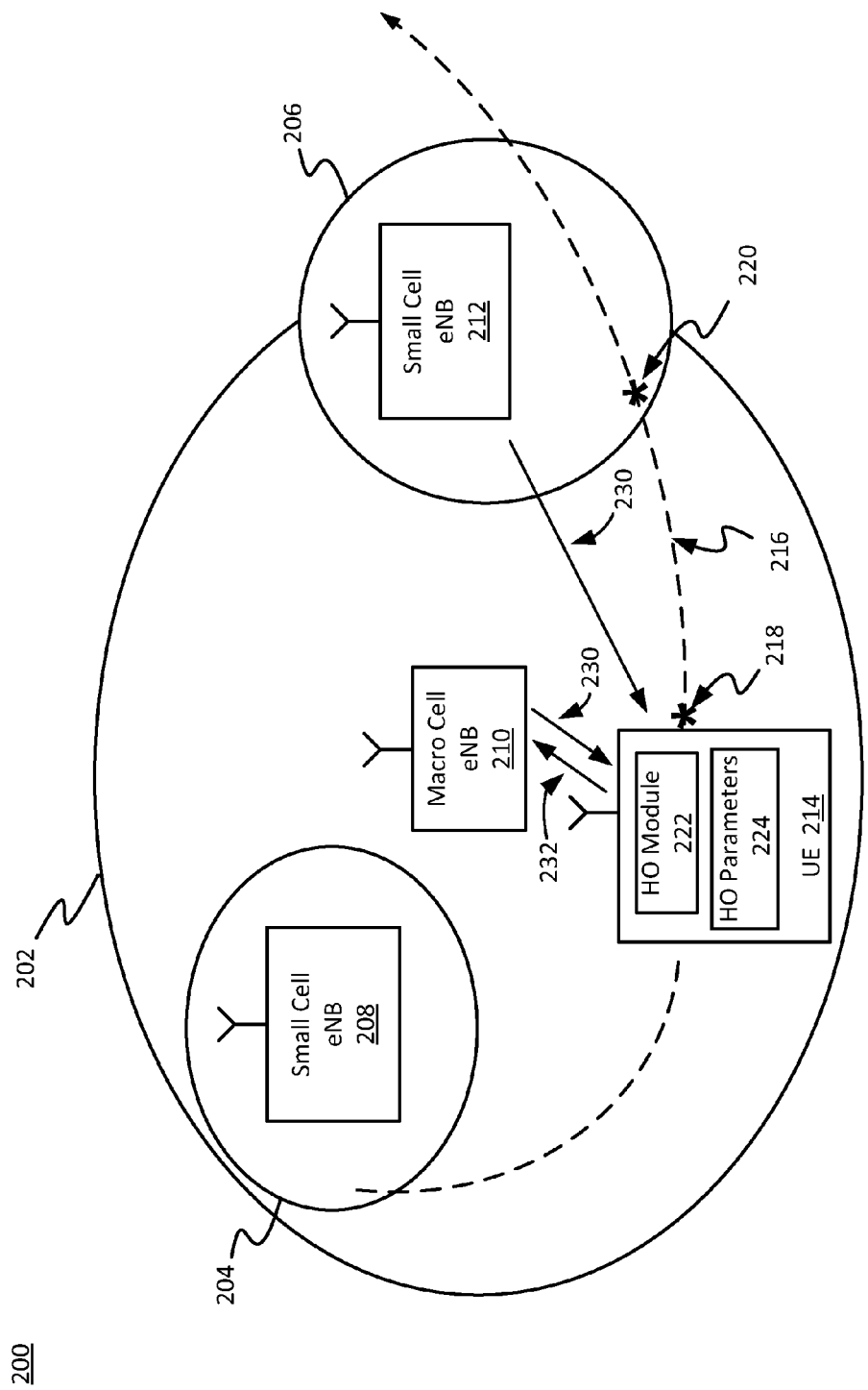
FIG. 2 illustrates an example wireless network system diagram according to various embodiments of the present disclosure.

FIG. 2 illustrates an example heterogeneous wireless network system diagram 200 according to various embodiments of the present disclosure. The heterogeneous wireless network 200 is shown in a simplified form to include a macro cell eNB 210, two small cell eNBs 208, 212 and a UE 214. Small cells may include, for example, pico cells and femto cells. The macro cell eNB 210 provides cell coverage area 202, while small cell eNB 208 provides cell coverage area 204 and small cell eNB 212 provides cell coverage area 206.

UE 214 is shown to travel on a path 216 through each of the cell coverage areas which may result in handovers between eNBs 208, 210, 212. UE 214 is configured to periodically monitor signals received from neighboring eNBs, e.g., eNBs 208, 212, while being served by a serving eNB, e.g., eNB 210. The UE 214 is configured to determine whether an entering condition (A3-1) for Event A3 (Neighbour becomes offset better than PCell) related to handover (HO) has been satisfied. Event A3, including entering and leaving conditions is described in Table 1. For example, when UE 214 is at location 218 on path 216, UE 214 may be served by eNB 210 and the entering condition A3-1 may not be satisfied. As UE 214 travels along path 216 toward location 220, the entering condition A3-1 may be satisfied, e.g., as the UE 214 approaches location 220. An HO measurement report may then be triggered in the UE 214 after a time interval, TimeToTrigger (TTT), after the Event A3 entering condition (condition A3-1) has been satisfied (if the Event A3 leaving condition does not become satisfied during the TTT). The HO measurement report may be provided to the serving eNB, e.g., eNB 210, at the expiry of the TTT time interval. The eNB 210 is configured to provide an HO command to the UE 214, in response to the HO measurement report. In response to, and based, at least in part, on, the HO command, the UE 214 is configured to connect to the neighboring cell, e.g., eNB 212.

TABLE 1

Event A3 (Neighbour becomes offset better than PCell)
The UE shall:
   1> consider the entering condition for this event to be satisfied when condition A3-1, as specified
     below, is fulfilled;
   1> consider the leaving condition for this event to be satisfied when condition A3-2, as specified
     below, is fulfilled;
   NOTE The cell(s) that triggers the event is on the frequency indicated in the associated
       measObject which may be different from the (primary) frequency used by the PCell.
Inequality A3-1 (Entering condition)
$M_n + Of_n + Oc_n - Hys > M_p + Of_p + Oc_p + Off$
Inequality A3-2 (Leaving condition)
$M_n + Of_n + Oc_n + Hys < M_p + Of_p + Oc_p + Off$
The variables in the formula are defined as follows:
   Mn is the measurement result of the neighbouring cell, not taking into account any offsets.
   Ofn is the frequency specific offset of the frequency of the neighbour cell (i.e. offsetFreq as defined
     within measObjectEUTRA corresponding to the frequency of the neighbour cell).
   Ocn is the cell specific offset of the neighbour cell (i.e. cellIndividualOffset as defined within TABLE 1-continued measObjectEUTRA corresponding to the frequency of the neighbour cell), and set to zero if not configured for the neighbour cell.

Mp is the measurement result of the PCell, not taking into account any offsets.

Ofp is the frequency specific offset of the primary frequency (i.e. offsetFreq as defined within measObjectEUTRA corresponding to the primary frequency).

Ocp is the cell specific offset of the PCell (i.e. cellIndividualOffset as defined within measObjectEUTRA corresponding to the primary frequency), and is set to zero if not configured for the PCell.

Hys is the hysteresis parameter for this event (i.e. hysteresis as defined within reportConfigEUTRA for this event).

Off is the offset parameter for this event (i.e. a3-Offset as defined within reportConfigEUTRA for this event).

Mn, Mp are expressed in dBm in case of RSRP, or in dB in case of RSRQ.

The TTT time interval may be determined based, at least in part, on HO parameter(s) provided by the NM 102, e.g., via eNB 210, and may be adjusted by mobility state parameters. If the TTT is too long, the SINR (signal to noise plus interference ratio) of the signal from serving eNB 210 may be too degraded for the UE 214 to reliably receive the HO command and handover failure (HOF) and/or radio link failure (RLF) may result. On the other hand, if the TTT is too short and the UE 214 is moving in and out of cells relatively quickly, the UE 214 may successfully complete HO (e.g., from eNB 210 to eNB 212) only to be handed over again (e.g., from eNB 212 to eNB 210), thus, resulting in a short Time of Stay (short ToS). In order for a handover to be successful, the UE 214 must receive the HO command from the serving eNB, e.g., eNB 210.

Figure 3:
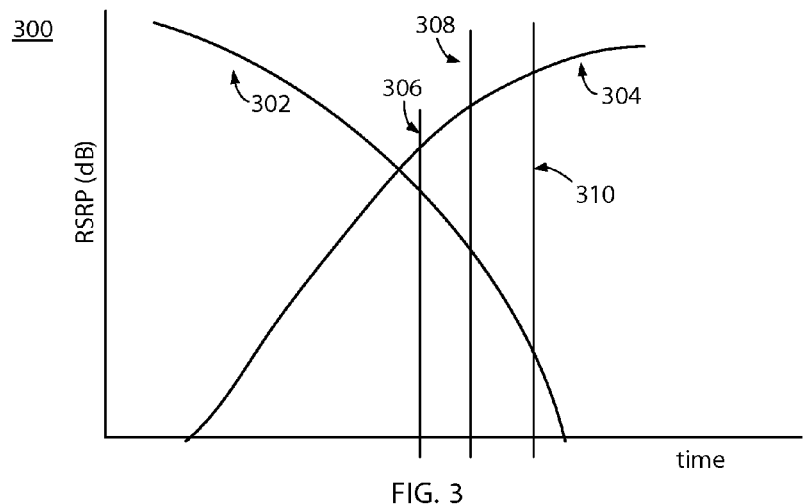
FIG. 3 illustrates a plot of serving cell and target (i.e., neighbor) cell reference signal received power (RSRP) consistent with the present disclosure.

FIG. 3 illustrates a plot 300 of serving cell reference signal received power (RSRP) 302 and target (i.e., neighbor) cell reference signal received power RSRP 304 consistent with the present disclosure. As a UE travels along path from a serving cell eNB towards a neighbor (i.e. target) cell eNB, the RSRP 302 from the serving cell eNB may decrease and the RSRP 304 from target cell eNB may increase. As illustrated by plot 302, as time goes on and the UE approaches the target cell eNB, RSRP 302 may decrease to less than RSRP 304 of the target cell eNB. At time 306, Event A3 entry condition (condition A3-1) may be satisfied and the TTT time interval may be initiated. At time 308, the TTT interval may expire and the UE may send an HO measurement report to the serving eNB. The serving RSRP 302 has continued to decrease and the target RSRP 304 has continued to increase between time 306 and time 308. At time 310, the serving eNB may send an HO command to the UE. Since serving RSRP 302 has continued to decrease and target RSRP 304 has continued to increase in the time interval between time 308 and time 310, the UE may be unable to receive the HO command due, at least in part, to the effects of the target signal on the SINR of the serving signal at the UE.

Figure 4:
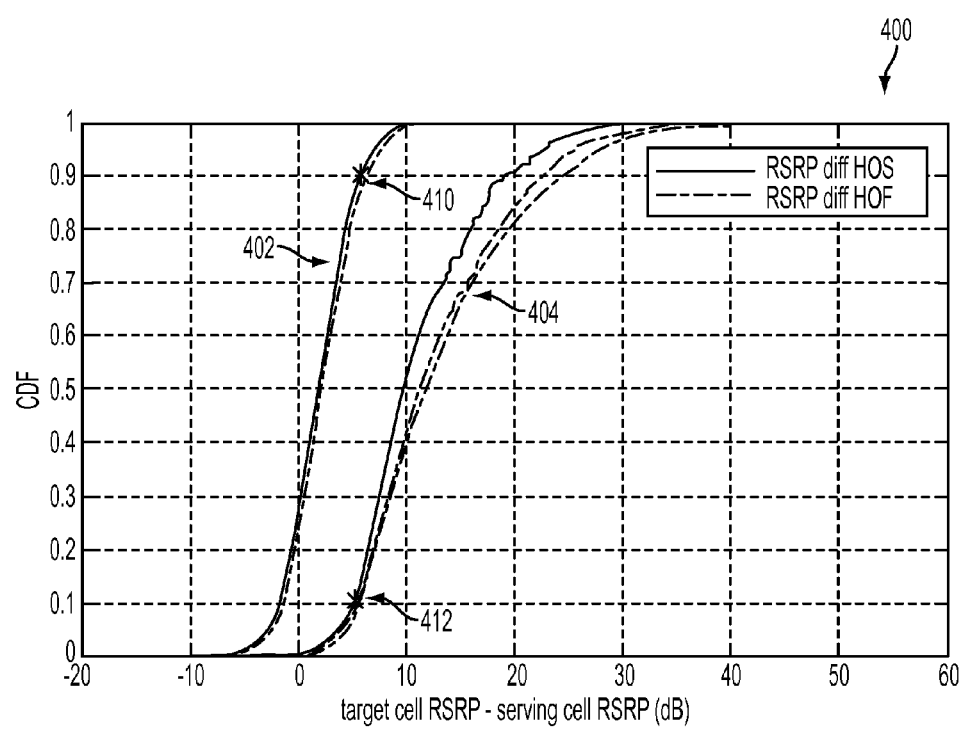
FIG. 4 illustrates a plot of cumulative distribution functions consistent with the present disclosure.

FIG. 4 illustrates a plot 400 of cumulative distribution functions 402, 404 consistent with the present disclosure. Plot 400 illustrates relationships between handover success (HOS) and handover failure (HOF) and a difference between a target cell RSRP and a serving cell RSRP (i.e., RSRP difference). Curves collectively labeled 402 represent the cumulative distribution function for HOS as a function of RSRP difference and curves collectively labeled 404 represent cumulative distribution functions for HOF as a function of RSRP difference. Point 410 on curves 402 and point 412 on curves 404 correspond to respective cumulative distributions for an approximate RSRP difference of 5 dB (decibels). Curves 402 and point 410 illustrate that the probability of HO success for RSRP differences less than or equal to about 5 dB is about 90%. Curves 404 and point 412 illustrate that the probability of HO failure for RSRP differences less than about 5 dB is about 10%. Curves 402 further illustrate that nearly 100% of HO successes occur for RSRP differences less than or equal to approximately 10 dB. Thus, plot 400 illustrates a correlation between HO failure rate, HO success rate and RSRP difference.

Turning again to FIG. 1, in an embodiment, NM 102 may include an HO module 108 and HO parameters 110. HO module 108 may be configured to generate, determine and/or select one or more of the HO parameters 110. HO module 108 may be further configured to select at least some of the HO parameters for provision to a UE via an eNB, e.g., UE 114 via eNB 106A. The UE 114 may be configured to utilize one or more of the provided HO parameters to improve handover, as described herein.

HO parameters 110 may include one or more RSRP difference threshold(s). A first RSRP difference threshold may correspond to a relatively high (e.g., near 100%) probability of HO failure (and likely Radio Link Failure (RLF)). A second RSRP difference threshold may correspond to a relatively short TTT and a relatively fast HO. The second RSRP difference threshold is configured to trigger an HO measurement report relatively quickly in order to reduce a likelihood of HO failure.

The relationship between HO failure rate, HO success rate and RSRP differences illustrated, e.g., in plot 400 may be utilized by NM 102 when determining the first RSRP threshold and/or the second RSRP difference threshold. For example, the first RSRP difference threshold may be set to 10 dB, an RSRP difference that corresponds to a maximum RSRP difference for any possible HO success. In other words, a measured RSRP difference greater than the maximum RSRP very likely corresponds to HO failure. In another example, the second RSRP difference threshold may be set to 4 dB, an RSRP difference that corresponds to a HO failure rate of less than 10% for RSRP differences less than or equal to 4 dB.

Of course the foregoing examples are merely representative of possible values of RSRP difference thresholds, and of course, the present disclosure is not limited by these examples.

HO parameters 110 may include one or more TTT, ToS pair(s), i.e., TTT values and ToS threshold values (e.g., time durations). The ToS value of each TTT, ToS pair may correspond to a threshold ToS. The TTT, ToS pair(s) are configured to allow a UE to avoid ping-ponging between cells when the measured RSRP difference is less than the second RSRP difference threshold. For example, the UE may be configured to select a TTT value based, at least in part, on an associated ToS value, if the determined RSRP difference is less than the second RSRP threshold. In other words, if the determined RSRP difference is greater than or equal to the second RSRP threshold, the TTT may be set to a minimum TTT in order to maximize the likelihood of a successful HO without regard for ping-ponging. If the determined RSRP difference is less than the second RSRP threshold, then a relatively larger TTT may be selected to avoid ping-ponging. The value of the relatively larger TTT may be selected based, at least in part, on a current ToS (i.e., a current time of stay of the UE in the serving cell).

Generally, a duration of the TTT of a TTT, ToS pair may be inversely related to the associated ToS threshold. Thus, a relatively short TTT may be associated with a relatively long ToS and a relatively long TTT may be associated with a relatively short ToS. As used herein, "short ToS" corresponds to a threshold ToS related to ping-ponging. A UE that stays in a cell for less than short ToS may be considered to be ping-ponging. A short ToS may thus correspond to a minimum ToS threshold. A maximum TTT may correspond to a difference between the short ToS and current ToS when the current ToS is less than the short ToS.

UE 214 may include HO module 222 and HO parameters 224. The HO parameters 224 correspond to at least some of HO parameters 110 that may be determined and provided by NM 102. HO module 222 may be configured to perform measurements on signals 230 received from eNBs 210, 212, e.g., to determine whether the Event A3 entering condition has been satisfied. HO module 222 is configured to determine an RSRP difference between a serving cell eNB, e.g., eNB 210, and a target cell eNB, e.g., eNB 212, based, at least in part, on measurements of the signals 230. HO module 222 may then select a TTT based, at least in part, on the determined RSRP difference.

HO module 222 is configured to compare the determined RSRP difference to the RSRP difference threshold(s) included in the HO parameters 224. For example, HO module 222 may be configured to recognize that HOF is likely if the determined RSRP difference is greater than or equal to the first RSRP difference threshold. In this example, HO module 222 may be configured to initiate HOF recovery. In another example, HO module 222 may be configured to select a minimum TTT if the determined RSRP difference is greater than or equal to the second RSRP difference threshold.

Thus, a UE may be configured to receive one or more HO parameters from NM 102 and, in operation, may be configured to select a TTT value (and initiate the TTT interval) in response to the Event A3 entry condition being satisfied. The UE may be configured to select the TTT value based, at least in part, on a determined RSRP difference between the RSRP of a target cell and the RSRP of the serving cell. The UE may be further configured to select the TTT value based, at least in part, on the current ToS of the UE in the current serving cell, if the determined RSRP difference is less than or equal to the second RSRP difference threshold.

Figure 5:
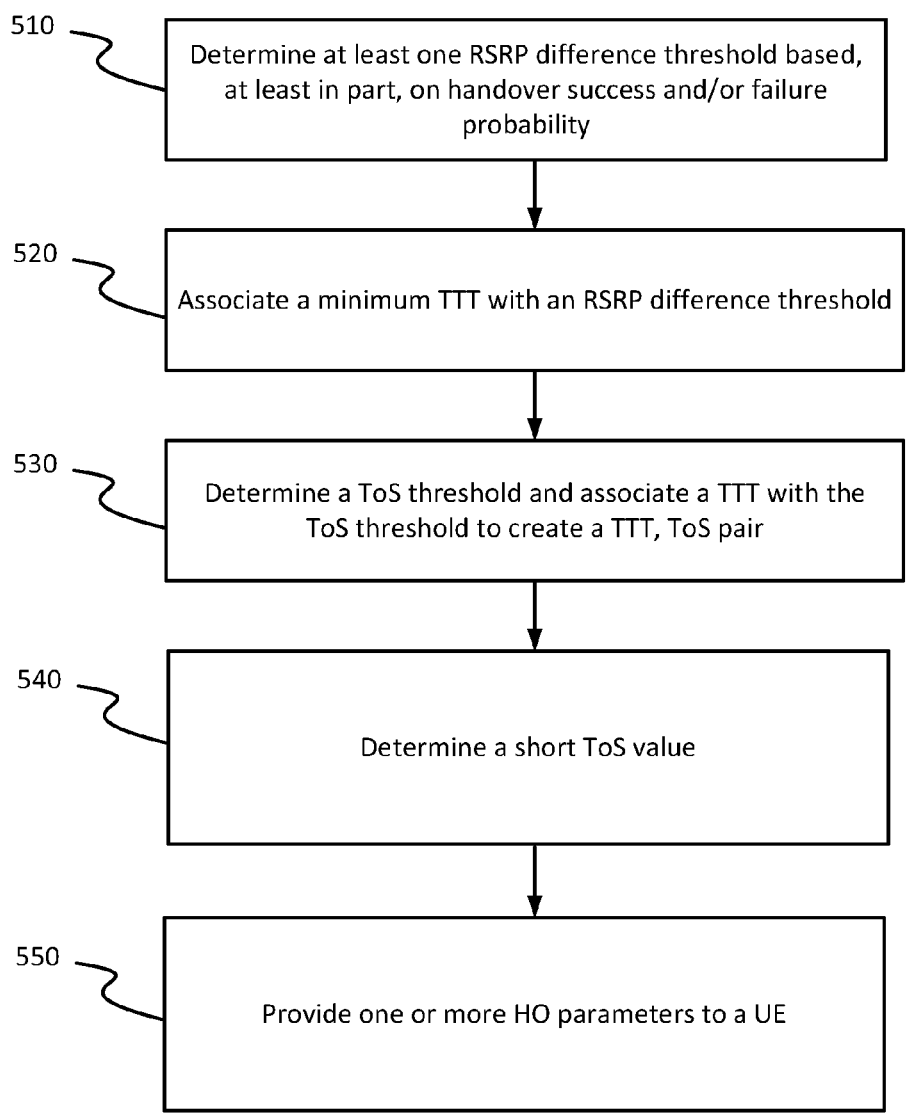
FIG. 5 illustrates a flowchart of example operations consistent with various embodiments of the present disclosure.

FIG. 5 illustrates a flowchart 500 of example operations consistent with various embodiments of the present disclosure. The operations of flowchart 500 may be performed, for example, by NM 102, and include providing one or more of the results to a UE, e.g. UE 214 of FIG. 2. The UE 214 may then be configured to, e.g., select a TTT based, at least in part, on the parameters provided by the NM 102. The parameters may be provided to the UE 214 at some point in time prior to the UE 214 utilizing them, as described herein.

Operations 510 may include determining at least one RSRP difference threshold based, at least in part, on handover success and/or failure probability. A minimum TTT may be associated with an RSRP difference threshold at operation 520. Operations 530 include determining a ToS threshold and associating a TTT with the ToS threshold to create a TTT, ToS pair. A short ToS value may be determined at operation 540. Operation 550 includes providing one or more HO parameters to a UE.

Figure 6:
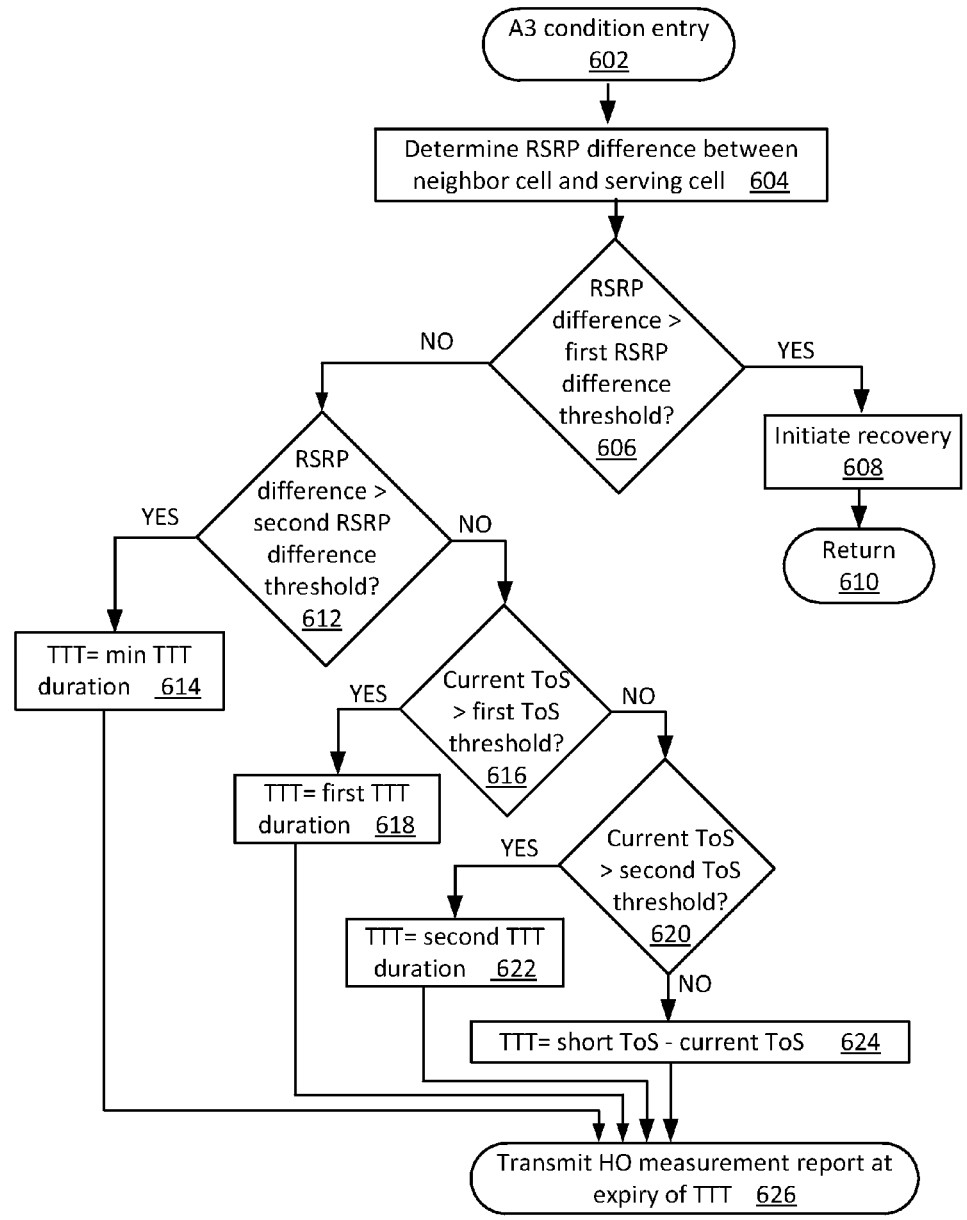
FIG. 6 illustrates a flowchart of example operation consistent with one embodiment of the present disclosure.

FIG. 6 illustrates a flowchart 600 of example operations consistent with one embodiment of the present disclosure. The operations of flowchart 600 may be performed, for example, by HO module 422 and UE 414. The example operations of flowchart 600 include a plurality of layers of TTT, ToS pairs. Of course this example is merely representative of a possible number of layers of TTT, ToS pairs, and of course, the present disclosure is not limited by this example.

The operations of flowchart 600 may be initiated in response to the Event A3 entry condition being satisfied at operation 602. An RSRP difference between a neighbor (i.e., target) cell and the serving cell may be determined at operation 604. In some embodiments, the RSRP difference may have been determined prior to the A3 condition entry. Thus, operations 604 may be performed before and/or after operation 602. Whether the RSRP difference is greater than a first RSRP threshold may be determined at operation 606. For example, the first RSRP threshold may be 10 dB. If the RSRP difference is greater than the first threshold, a HO failure likely will occur and recovery may be initiated at operation 608. Program flow may then return 610.

If the RSRP difference is less than or equal to the first RSRP difference threshold, whether the RSRP difference is greater than a second RSRP difference threshold may be determined at operation 612. For example, the second RSRP difference threshold may be 4 dB. If the RSRP difference is greater than the second RSRP difference threshold, TTT may be set to the minimum TTT duration at operation 614. For example, minimum TTT may be 20 milliseconds (ms). Program flow may then proceed to operation 626. If the RSRP difference is not greater than the second RSRP difference threshold, whether the current ToS is greater than a first ToS threshold may be determined at operation 616. For example, the first ToS threshold value may be two seconds. If the current ToS is greater than the first ToS threshold, TTT may be set to a first TTT duration at operation 618. For example, the first TTT duration may be 40 ms. Program flow may then proceed to operation 626.

If the current ToS is not greater than the first ToS threshold, whether the current ToS is greater than a second ToS threshold may be determined at operation 620. For example, the second ToS threshold may be one second. If the current ToS is greater than the second ToS threshold, TTT may be set to a second TTT duration at operation 622. For example, the second TTT duration may be 210 ms. Program flow may then proceed to operation 626. If the current ToS is not greater than the second ToS threshold, TTT may be set to a difference between a short ToS and the current ToS at operation 624. For example, the short ToS may be one second. An HO measurement report may be transmitted at the expiry of the TTT interval at operation 626 (if the Event A3 leaving condition has not been met).

Of course the foregoing example is merely representative of possible values of RSRP difference thresholds, TTT durations, minimum TTT, ToS thresholds and short ToS, and of course, the present disclosure is not limited by these examples.

Figure 7:
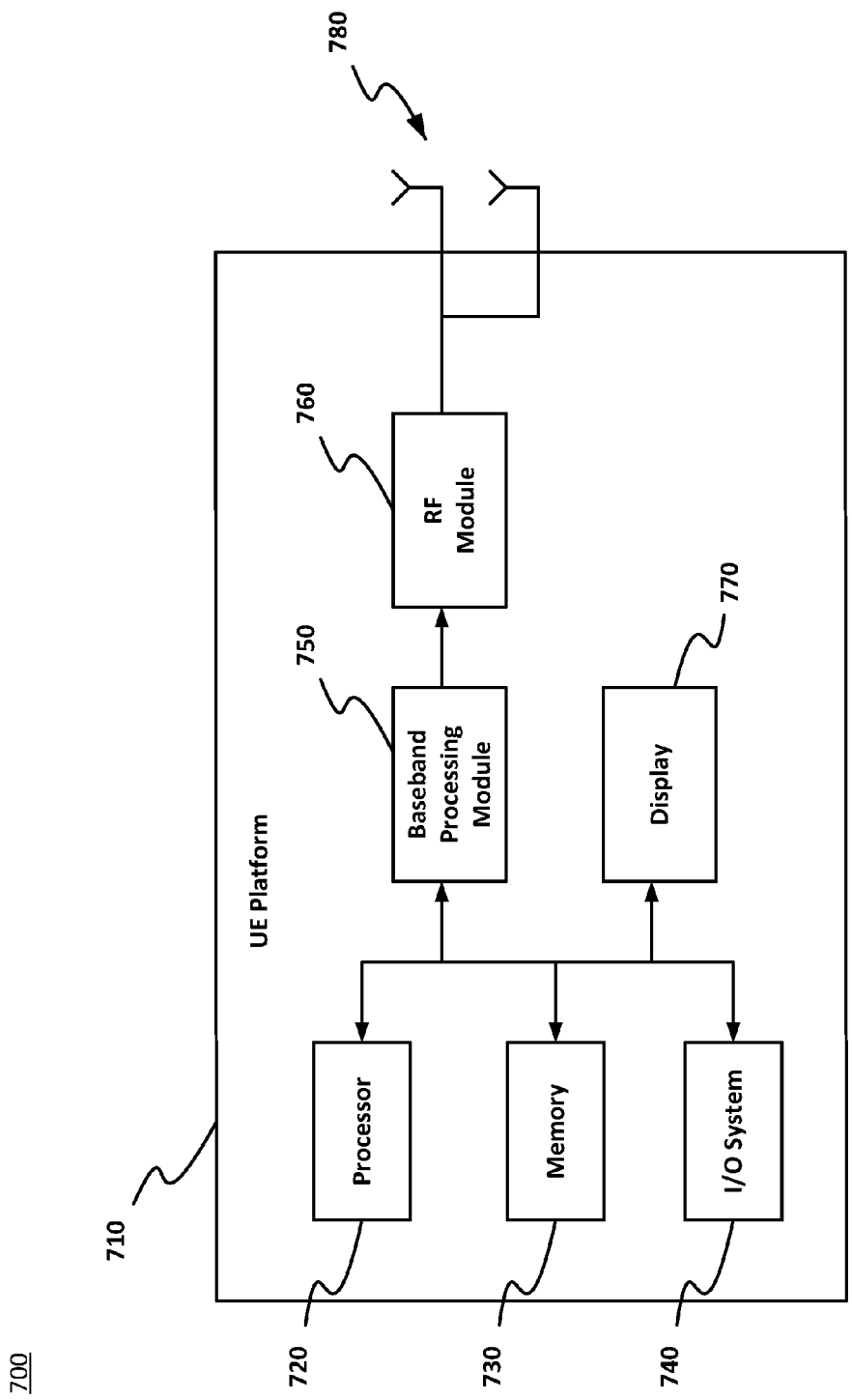
FIG. 7 illustrates a platform of one example embodiment consistent with the present disclosure.

FIG. 7 illustrates a platform configuration 700 of one example embodiment consistent with the present disclosure. For example, UE 214 may correspond to platform 700. The platform 710 may be a mobile communication device, such as, for example, a UE device (smartphone), a tablet, a laptop computing device or any other device configured to transmit or receive wireless signals. In some embodiments, platform 710 may include a processor 720, memory 730, an input/output (I/O) system 740, a display/keyboard or other type of user interface (UI) 770 such as, for example, a touchscreen. Platform 710 may further include a baseband processing module 750 and an RF processing module 760 as well as one or more antennas 780 which may form part of a Multiple Input Multiple Output (MIMO) antenna system. Any number of platforms 700 may transmit or receive signals through RF module 760 and antennas 780 over a wireless network which may be an LTE or LTE-A wireless network.

Figure 8:
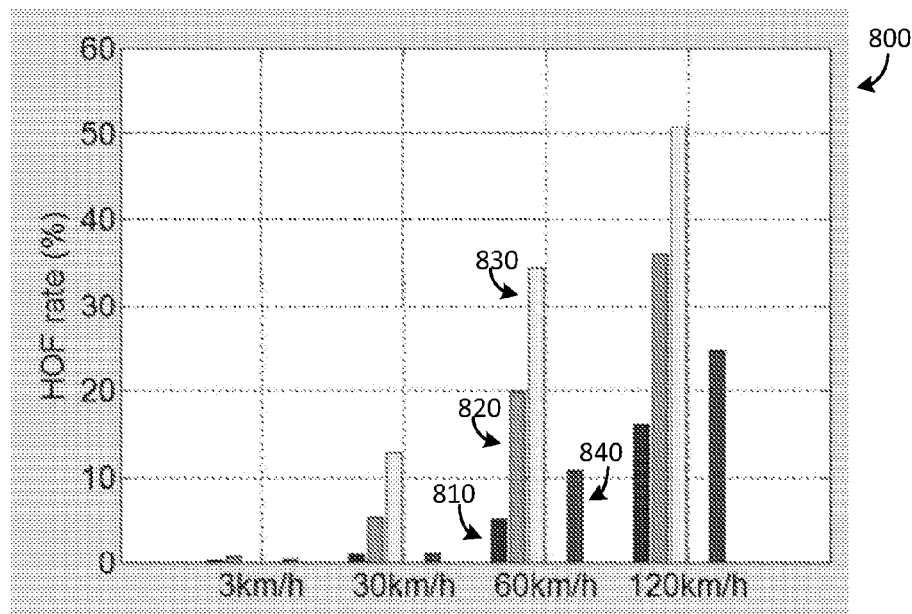
FIGS. 8 and 9 illustrate performance data consistent with one embodiment of the present disclosure.
Figure 9:
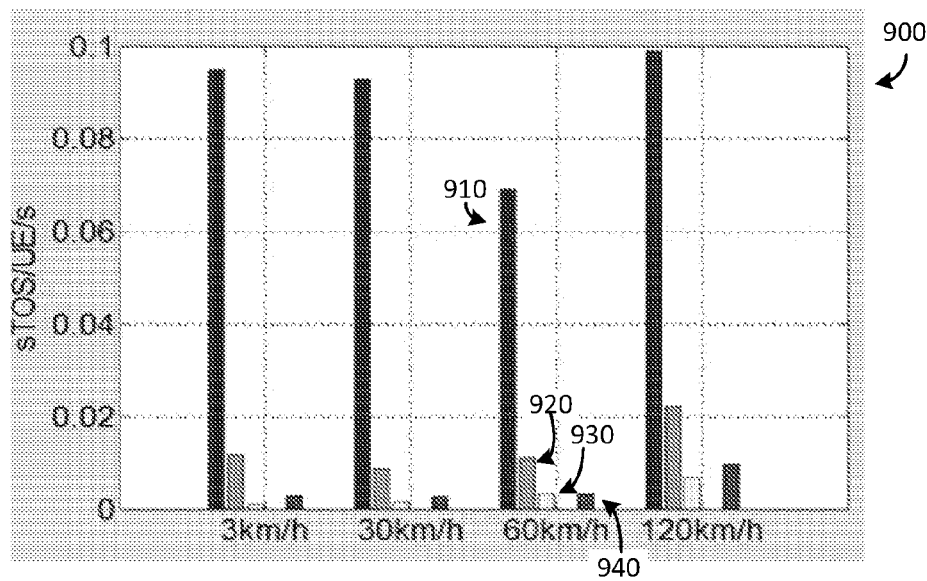

FIGS. 8 and 9 illustrate performance data consistent with one embodiment of the present disclosure. The performance data are configured to illustrate a comparison of fixed TTT values (i.e., independent of RSRP difference between target and serving cells) with TTT values selected based, at least in part, on the RSRP difference between the target and serving cells. FIG. 8 illustrates a bar graph 800 of HO failure rate in percent (%) and FIG. 9 illustrates a bar graph 900 of short ToS (i.e., ping pong) per UE per second versus UE speed in kilometers per hour (km/h) for speeds of 3, 30, 60 and 120 km/h. For each UE speed, moving from left to right, the first bar, e.g., bars 810, 910, corresponds to a fixed TTT of 40 ms, the second bar, e.g., bars 820, 920, corresponds to a fixed TTT of 210 ms, the third bar, e.g., bars 830, 930, corresponds to a fixed TTT of 480 ms, and the fourth bar, e.g., bars 840, 940, corresponds to TTT selected, e.g., based at least in part, on the RSRP difference, as described herein.

Figure 10:
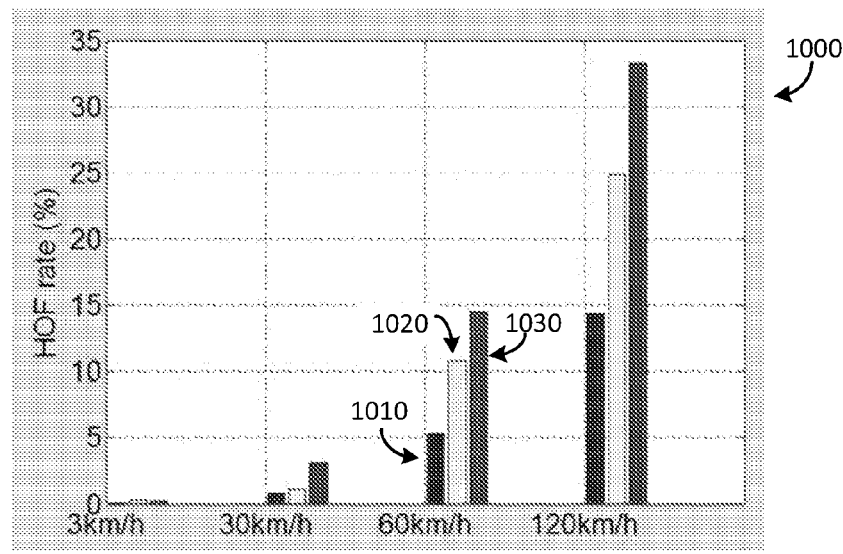
FIGS. 10 and 11 illustrate performance data consistent with one embodiment of the present disclosure.
Figure 11:
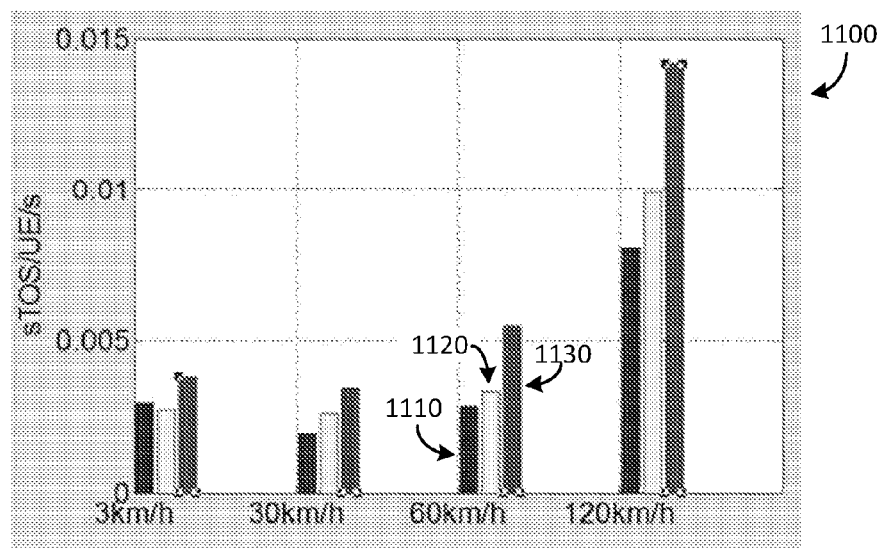

FIGS. 10 and 11 illustrate performance data consistent with one embodiment of the present disclosure. The performance data is configured to illustrate a comparison of performance for wireless network systems, e.g., system 100 of FIG. 1, that include a macro cell only, a macro cell with two pico cells and a macro cell with four pico cells. FIG. 10 illustrates a bar graph 1000 of HO failure rate in percent (%) and FIG. 11 illustrates a bar graph 1100 of short ToS (i.e., ping pong) per UE per second versus UE speed in kilometers per hour (km/h) for speeds of 3, 30, 60 and 120 km/h. For each UE speed, moving from left to right, the first bar, e.g., bars 1010, 1110, corresponds to the macro cell only, the second bar, e.g., bars 1020, 1120, corresponds to the macro cell with two pico cells and the third bar, e.g., bars 1030, 1130, corresponds to the macro cell with four pico cells.

Of course the foregoing examples are merely representative of the types of scenarios where HO may occur, and of course, the present disclosure is not limited by these examples.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all sub-combinations of such operations are enabled as would be understood by one of ordinary skill in the art.

The storage medium may include any type of tangible storage device, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A "module", as used in any embodiment herein, may be embodied as circuitry, software, instruction sets, code (e.g., source code, executable code, etc), etc. The circuitry may be embodied as an integrated circuit, such as an integrated circuit chip.

Thus, the present disclosure provides devices, methods, systems and computer-readable storage medium for improved handover with ping pong avoidance in wireless heterogeneous networks. The following examples pertain to further embodiments.

According to one aspect there is provided a UE. The UE may include a handover (HO) module configured to determine a reference signal received power (RSRP) difference between a serving cell and a neighbor cell and to select a TimeToTrigger (TTT) related to an HO measurement report based, at least in part, on the RSRP difference.

Another example UE includes the forgoing components and the HO module is configured to select a minimum TTT when the RSRP difference is less than or equal to a first RSRP difference threshold and greater than a second RSRP difference threshold.

Another example UE includes the forgoing components and the HO module is configured to select the TTT based, at least in part, on a current Time of Stay (ToS) in the serving cell, when the RSRP difference is less than or equal to a second RSRP difference threshold.

Another example UE includes the forgoing components and the HO module is configured to determine the TTT based, at least in part, on a short ToS.

Another example UE includes the forgoing components and the HO module is configured to recognize HO failure and initiate recovery when the RSRP difference is greater than a first RSRP difference threshold.

Another example UE includes the forgoing components and the HO module is configured to determine the RSRP difference at least one of prior to and/or in response to an Event A3 entry condition being satisfied, the Event A3 condition related to an RSRP of the neighbor cell becoming an offset greater than the RSRP of the serving cell.

According to another aspect there is provided a method. The method may include determining, by a network manager (NM) handover (HO) module, at least one reference signal received power (RSRP) difference threshold; and providing, by an evolved Node B (eNB), the at least one RSRP difference threshold to user equipment (UE).

Another example method includes the forgoing operations and the at least one RSRP difference threshold is determined based, at least in part, on at least one of a handover success or a handover failure probability.

Another example method includes the forgoing operations and the at least one RSRP difference threshold comprises a first RSRP difference threshold related to a probability of handoff failure and a second RSRP difference threshold related to a minimum TimeToTrigger (TTT).

Another example method includes the forgoing operations and the first RSRP difference threshold is equal to 10 decibels (dB) and the second RSRP difference threshold is equal to 4 dB.

Another example method includes the forgoing operations and further includes associating, by the NM HO module, the second RSRP difference threshold with the minimum TTT; and providing, by the eNB, the associated RSRP difference threshold and minimum TTT to the UE.

Another example method includes the forgoing operations and further includes determining, by a UE HO module, a RSRP difference between a serving cell and a neighbor cell; and selecting, by the UE HO module, a TimeToTrigger (TTT) related to an HO measurement report based, at least in part, on the RSRP difference and the second RSRP difference threshold.

Another example method includes the forgoing operations and further includes selecting, by the UE HO module, the minimum TTT when the RSRP difference is less than or equal to the first RSRP difference threshold and greater than the second RSRP difference threshold.

Another example method includes the forgoing operations and further includes determining, by a UE HO module, a RSRP difference between a serving cell and a neighbor cell; and initiating, by the UE HO module, a handoff failure recovery when the RSRP difference is greater than the first RSRP difference threshold.

Another example method includes the forgoing operations and further includes determining, by the NM HO module, a Time of Stay (ToS) threshold; associating, by the NM HO module, a first TTT with the ToS threshold to create a first TTT, ToS pair; and providing, by the eNB, the first TTT, ToS pair to the UE.

Another example method includes the forgoing operations and further includes selecting, by the UE HO module, the TTT based, at least in part, on a current Time of Stay (ToS) in the serving cell, when the RSRP difference is less than or equal to the second RSRP difference threshold.

Another example method includes the forgoing operations and further includes determining, by the HO module, the TTT based, at least in part, on a short ToS.

According to another aspect there is provided a network manager (NM). The NM may include a network manager (NM) handover (HO) module configured to determine at least one reference signal received power (RSRP) difference threshold and to provide the at least one reference signal to user equipment (UE) via an evolved Node B (eNB).

Another example NM includes the forgoing components and the at least one RSRP difference threshold comprises a first RSRP difference threshold related to a probability of handoff failure and a second RSRP difference threshold related to a minimum TimeToTrigger (TTT).

Another example NM includes the forgoing components and the first RSRP difference threshold is equal to 10 dB (decibels) and the second RSRP difference threshold is equal to 4 dB.

Another example NM includes the forgoing components and the NM is further configured to associate the second RSRP difference threshold with the minimum TTT and to provide the associated RSRP difference threshold and minimum TTT to the UE via the eNB.

Another example NM includes the forgoing components and the NM is further configured to determine a Time of Stay (ToS) threshold, to associate a first TTT with the ToS threshold to create a first TTT, ToS pair and to provide the first TTT, ToS pair to the UE.

According to another aspect there is provided at least one computer-readable storage medium having instructions stored thereon which when executed by a processor cause the processor to perform the operations of the method as described in any of the examples above.

According to another aspect there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. User Equipment (UE) comprising at least a processor, handover (HO) circuitry and at least one non-transitory computer readable medium including instructions encoded in the at least one non-transitory computer readable medium to cause the processor to effect:
    receiving, from a network manager communicatively coupled to the UE, a first reference signal received power (RSRP) difference threshold based upon a low probability of handover success and a second RSRP difference threshold to trigger expedited HO reporting;
    determining, by HO circuitry in the UE, a RSRP difference between a serving cell and a neighbor cell;
    when the RSRP difference is determined to be greater than the first RSRP difference threshold by the UE, initiating HO failure recovery;
    when the RSRP difference is determined to be less than or equal to the first RSRP threshold and greater than the second RSRP threshold by the UE, selecting a minimum TimeToTrigger (TTT) interval based on HO parameters provided by the network manager;
    when the RSRP difference is determined to be less than or equal to the second RSRP difference threshold by the UE, selecting the TTT interval based, at least in part, on a current Time of Stay (ToS) in the serving cell; and
    triggering a HO measurement report at the expiry of the TTT interval.

2. The UE of claim 1, said instructions when executed by said processor further effect determining the TTT based, at least in part, on a short ToS.

3. The UE of claim 1, said instructions when executed by said processor further effect determining the RSRP difference at least one of prior to and/or in response to an Event A3 entry condition being satisfied;
    setting the Event A3 condition related to an RSRP of the neighbor cell as an offset greater than the RSRP of the serving cell.

4. A method for controlling handover (HO) to user equipment (UE) comprising:
providing a network manager comprising network manager handover (NM HO) circuitry;
providing UE comprising handover (HO) circuitry, a processor, a non-transitory computer readable medium, and instructions encoded in the non-transitory computer readable medium;
determining, by the NM HO circuitry in the network manager, a first reference signal received power (RSRP) difference threshold based upon a low probability of handover success and a second RSRP difference threshold to trigger expedited HO reporting;
determining, by the HO circuitry in the UE, a RSRP difference between a serving cell and a neighbor cell;
when the RSRP difference is determined to be greater than the first RSRP difference threshold by the UE, initiating HO failure recovery;
when the RSRP difference is determined to be less than or equal to the first RSRP threshold and greater than the second RSRP threshold by the UE, selecting a minimum TimeToTrigger (TTT) interval based on HO parameters provided by the network manager;
when the RSRP difference is determined to be less than or equal to the second RSRP difference threshold by the UE, selecting the TTT interval based, at least in part, on a current Time of Stay (ToS) in the serving cell; and
triggering a HO measurement report at the expiry of the TTT interval.

5. The method of claim 4, wherein the first RSRP difference threshold is equal to 10 decibels (dB) and the second RSRP difference threshold is equal to 4 dB.

6. The method of claim 4, further comprising associating, by the NM HO circuitry, the second RSRP difference threshold with the minimum TTT.

7. The method of claim 4, further comprising:
determining, by the NM HO circuitry, a Time of Stay (ToS) threshold;
associating, by the NM HO circuitry, a first TTT with the ToS threshold to create a first TTT, ToS pair; and
providing, by an eNB, the first TTT, ToS pair to the UE.

8. The method of claim 4, further comprising:
determining, by the HO circuitry, the TTT based, at least in part, on a short ToS.

9. A non-transitory computer-readable medium disposed in User Equipment (UE) comprising one or more processors having stored thereon, individually or in combination, instructions that when executed by said one or more processors effect:
receiving from network manager handover (NM HO) circuitry in a network manager, a first reference signal received power (RSRP) difference threshold based upon a low probability of handover success and a second RSRP difference threshold to trigger expedited HO reporting;
determining, by handover (HO) circuitry in the UE, a RSRP difference between a serving cell and a neighbor cell;
when the RSRP difference is determined to be greater than the first RSRP difference threshold by the UE, initiating HO failure recovery;
when the RSRP difference is determined to be less than or equal to the first RSRP threshold and greater than the second RSRP threshold by the UE, selecting a minimum TimeToTrigger (TTT) interval based on HO parameters provided by the network manager;
when the RSRP difference is determined to be less than or equal to the second RSRP difference threshold by the UE, selecting the TTT interval based, at least in part, on a current Time of Stay (ToS) in the serving cell; and
triggering a HO measurement report at the expiry of the TTT interval.

* * * * *